US006650353B2

(12) United States Patent
Comeau et al.

(10) Patent No.: US 6,650,353 B2
(45) Date of Patent: Nov. 18, 2003

(54) METHOD AND SYSTEM FOR FOCUS CONTROL IN IMAGING ENGINE WITH SPATIAL LIGHT MODULATOR

(75) Inventors: Bryan M. Comeau, Atkinson, NH (US); Dwayne Bailey, North Andover, MA (US); Roy D Allen, North Andover, MA (US); David Joel Romano, Lowell, MA (US)

(73) Assignee: AGFA Corporation, Wilmington, DE (US)

( * ) Notice: Subject to any disclaimer, the term of this patent is extended or adjusted under 35 U.S.C. 154(b) by 54 days.

(21) Appl. No.: 10/117,775

(22) Filed: Apr. 5, 2002

(65) Prior Publication Data

US 2003/0189632 A1 Oct. 9, 2003

(51) Int. Cl.[7] .................... G01M 11/00; G01D 18/00; G01D 15/14; B41J 2/44; B41J 2/445

(52) U.S. Cl. ........................ 347/239; 347/255; 702/1; 702/85; 702/86

(58) Field of Search ........................ 356/243.1, 243.5; 702/85, 86, 1; 347/239, 255

(56) References Cited

U.S. PATENT DOCUMENTS 5,072,239 A * 12/1991 Mitcham et al. ............ 347/255
5,323,002 A 6/1994 Sampsell et al.

FOREIGN PATENT DOCUMENTS

| | | | | |
|---|---|---|---|---|
| EP | 437766 A2 * | 7/1991 | .......... | G06K/15/12 |
| EP | 0791863 | 10/1995 | .......... | G03G/15/00 |
| WO | WO 91/15843 * | 10/1991 | ............ | H04N/9/31 |
| WO | 0069631 | 11/2000 | ........... | B41B/15/00 |

* cited by examiner

*Primary Examiner*—Huan Tran
(74) *Attorney, Agent, or Firm*—Grant Houston; Robert A. Sabourin

(57) ABSTRACT

A calibration system for a platesetter or imagesetter is applicable to systems that have a media drum and a carriage, including a light source and a spatial light modulator for selectively exposing the media that is held against the drum. The invention can be applied to internal or external drum systems. The calibration system comprises a calibration sensor that is scanned relative to the spatial light modulator. The controller then analyzes the response of the calibration sensor to generate calibration information that is used to configure the spatial light modulator. The use of this calibration sensor allows for job-to-job calibration of the spatial light modulator, in one example, that ensures; the generation of a high quality images, without banding, for example, on the media. This calibration system is also used to detect a best focus position for projection optics by measuring a contrast ratio between exposure and dark levels for various focus settings. It selects the best focus position in response to the contrast ratio.

16 Claims, 10 Drawing Sheets

Focus calibration subsequence

METHOD AND SYSTEM FOR FOCUS CONTROL IN IMAGING ENGINE WITH SPATIAL LIGHT MODULATOR

BACKGROUND OF THE INVENTION

Imagesetters and platesetters are used to expose the media that are used in many conventional offset printing systems. Imagesetters are typically used to expose film that is then used to make the plates for the printing system. Platesetters are used to directly expose the plates.

In imagesetters and platesetters, throughput and uptime are critical metrics. These systems typically operate in commercial environments. Their throughput is often used as the criteria for selecting between the various commercially available systems.

The cycle time, and consequently throughput, for a platesetter or imagesetter is largely dictated by the time that the imaging engine requires to expose the media. Most conventional systems expose the media by scanning. In a common implementation, the plate or film media is fixed to the outside or inside of a drum and then scanned with a laser source in a raster fashion. The laser's dot is moved longitudinally along the drum's axis, while the drum is rotated under the dot. As a result, by modulating the laser, the media is selectively exposed in a continuous helical scan.

In these drum-scanning systems, a number of criticalities can dictate the cycle time. One limitation can be the speed at which the laser is modulated. This is related to the resolution that is required on the media. Another limitation is laser power. As the scan rates increase, the power that the laser generates must also be increased since the time to expose each pixel on the media decreases.

To overcome some of these inherent limitations, systems are being proposed that use a combination of a light source and a spatial light modulator (SLM). Such modulators are usually based on liquid crystal technology. In one example, the light source is pulsed with a fixed periodicity. The data determining the plate exposure is then used to drive the spatial light modulator. This results in the media being exposed in a series of separate sub-images in the fashion of a stepper. As a result, the speed of operation is no longer limited by the rate at which the laser can be modulated or the power that can be extracted from that single laser.

SUMMARY OF THE INVENTION

One issue that arises in these SLM-based systems concerns the focus setting for optics that projects the light through the SLM. The process is more complex than conventional systems that merely focus the laser spot onto the drum. As a result, even if the focus setting is accurately determined in the factory, over time as components age and with thermal cycling, the imagesetter or platesetter can drift out of its best focus.

In general, according to one aspect, the invention features a calibration system for a platesetter or imagesetter. It comprises a media drum and a carriage that includes a light source and a spatial light modulator for selectively exposing media that is held against the drum.

This calibration system comprises a calibration sensor. The spatial light modulator is scanned relative to this calibration sensor. The controller analyzes the response of the calibration sensor to develop focus information that is used to control how light is projected through the spatial light modulator and onto the drum.

In the preferred embodiment, the calibration sensor comprises a photodiode and a slit aperture that enable the detection of responses of individual elements of the spatial light modulator.

In operation, the controller compares exposure levels provided by the spatial light modulator for different focus settings. In the preferred embodiment, the controller also compiles the dark levels provided by the spatial light modulator. Preferably, the controller generates a focus setting based on the best contrast ratio between the exposure levels and the dark levels provided by the spatial light modulator. In this way, the system optimizes focus for the contrast ratio, which is a figure of merit for the system's performance.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
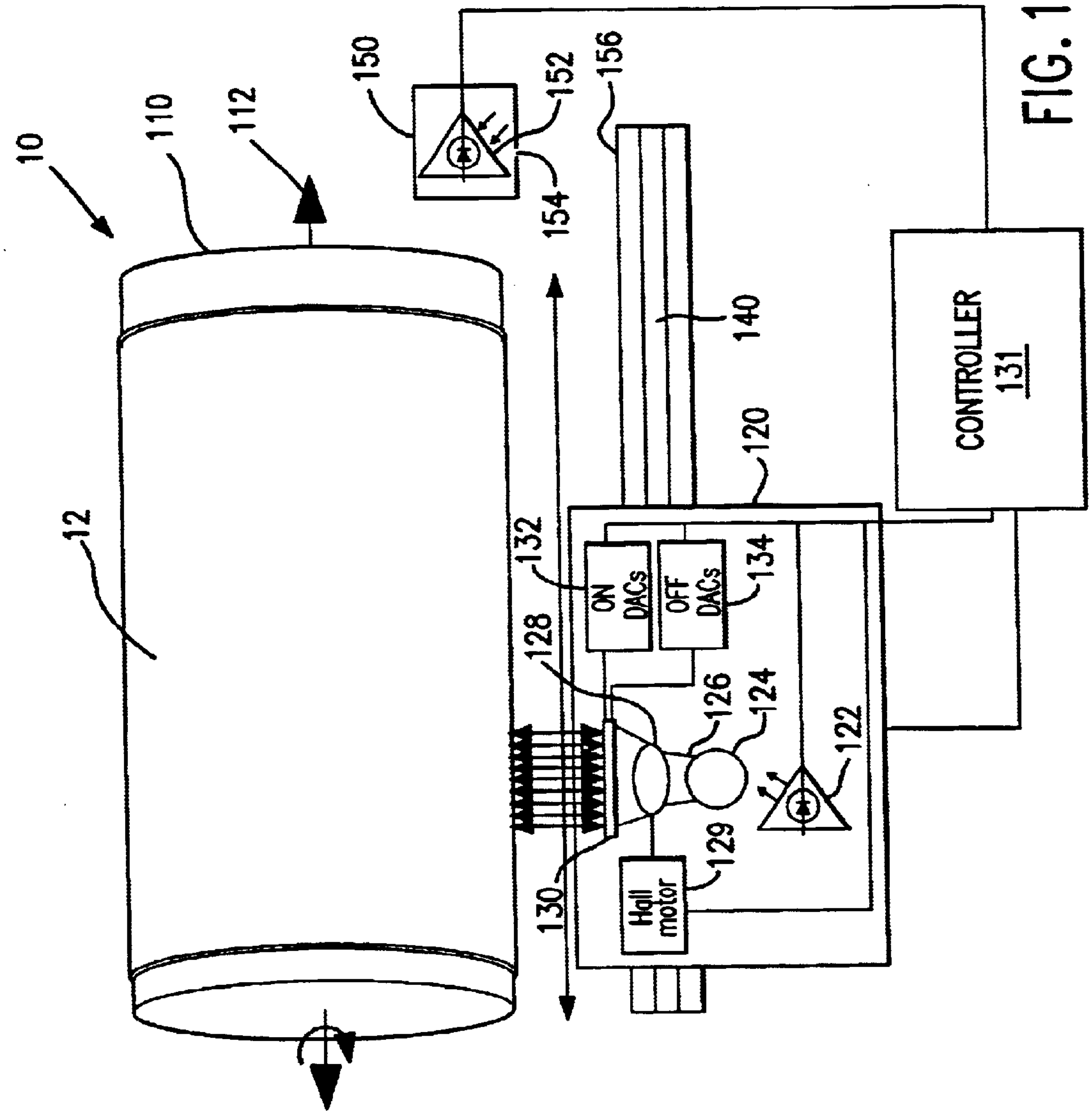
FIG. 1 is a plan view of a platesetter imaging engine according to the present invention.

FIG. 1 shows an imaging engine that has been constructed according to the principles of the present invention. This imaging engine 10 can be deployed in a platesetter in which the media 12 is a photosensitive plate. In another implementation, it is deployed in an imagesetter in which the media 12 is film.

The imaging engine 10 comprises a media drum 110. The drum 110 revolves around an axis-of-rotation 112 that is co-axial with the drum 110. In the illustrated example, the media 12 is held against the outside of the drum 110. This configuration is typically termed an external drum configuration.

In an alternative implementation, the media 12 is held along an inner side of the drum 110 to provide an internal drum configuration.

A carriage 120 is disposed adjacent to the drum 110. It is controlled by a controller 131 to move along track 140 that extends parallel to the rotational axis 112 of the drum 110.

In the internal drum configuration, the carriage 120 moves within the drum 110 and is typically supported on a cantilever-like track, generally extending down through the center of the drum 110.

In either case, the carriage 120 supports a light source 122. In the present implementation, this light source 122 comprises an array of laser diodes. The beams from these laser diodes are combined into a single output and coupled into an integrator 124.

Generally, because of the multi-source nature and because individual laser diodes have spatial intensity profiles that are somewhat Gaussian, the integrator 124 is typically required to generate a beam 126 with a rectangular cross section and with a uniform spatial intensity profile.

The spatially homogeneous beam 126 is coupled to projection optics 128, which ensure that the beam has a rectangular cross-section and a planar phase front. This rectangular beam is then coupled through a spatial light modulator 130 to the media 12 held on the drum 110. A Hall effect focus motor 129 is used to adjust the focus position provide by the projection optics under control of the controller 131.

In the present implementation, the spatial light modulator 130 comprises a linear array of grating light valves. The elements of the grating light valve array function as shutters that control the level of transmission to the media 12. Generally, each grating light valve comprises an optical cavity that will propagate light through the grating light valve to the media in response to the optical size of the cavity and the wavelength of light generated by the light source 122.

In other implementations, different spatial light modulators are used. For example, in some examples, the spatial light modulator comprises a two-dimensional array of elements. Different types of spatial light modulators can also be used, such as spatial light modulators based on liquid crystal or tilt mirror technology.

In the present implementation, the operation of the spatial light modulator elements is controlled by an ON DAC system 132 and an OFF DAC system 134. These devices dictate the binary modulation level of the elements of the spatial light modulator 130.

The operation of the elements of the spatial light modulator 130 are controlled in a binary fashion such that, during operation, they are either in an ON or transmissive state to expose the corresponding pixel on the media 12, or an OFF state or dark, non-transmissive state to leave the corresponding pixel on the media 12 unexposed. Whether the elements of the spatial light modulator 130 are in a transmissive or non-transmissive state depends on the size of their respective optical cavities. Each element of the spatial light modulator 130 has a corresponding ON digital-to-analog converter in the ON DAC system 132 and an OFF digital-to-analog converter in the OFF DAC system 134. These DAC's are loaded with ON and OFF control level data that dictate the drive voltages used to control the elements during their on and off states. These ON and OFF control level data are loaded into the ON DACS 132 and the OFF DACS 134 by the controller 131.

According to the invention, a calibration sensor 150 is provided. In the present embodiment, this calibration sensor 150 comprises a photodiode 152 and a slit aperture 154. The combination of the photodiode 152 and the slit aperture 154 enable the controller 131 to monitor the operation of individual elements of the spatial light modulator 130 when the carriage is moved to the calibration position 156, such that it is opposite the calibration sensor 150.

Figure 2:
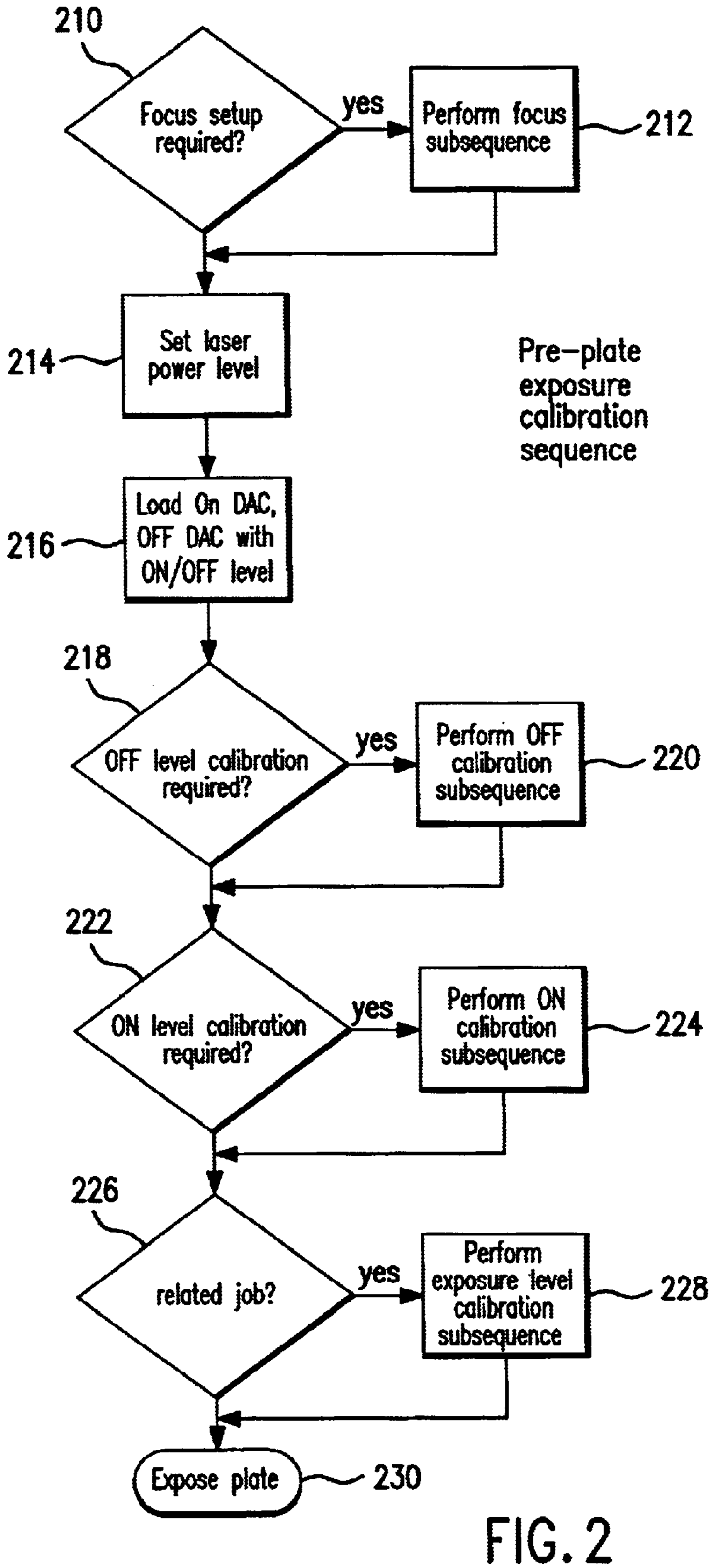
FIG. 2 is a flow diagram illustrating a pre-plate exposure calibration sequence according to the present invention.

FIG. 2 is a flow diagram illustrating a pre-plate exposure calibration sequence.

Typically, this pre-plate exposure calibration sequence is run when the imagesetter or platesetter is first powered up. In an alternative implementation, this sequence is run before every exposure of the media 12 held on the drum 110.

Specifically, in step 210, the controller 131 determines whether a focus set-up subsequence should be run. If the controller 131 determines that focus set up is required, then the focus set up subsequence 212 is performed. Generally, this focus set-up occurs on a periodic basis. Alternatively, it can be performed before every plate exposure cycle. Sometimes, it is only performed when the machine is initially powered-up.

The laser power level is set in step 214. Specifically, the controller 131 sets the drive current that is supplied to the light source 122 in the carriage 120. Typically, the laser power level is read by the controller 131. It can be the last laser power setting that was used, or it can be a laser power setting that is set in the machine during factory calibration.

The ON DAC system 132 and the OFF DAC system 134 are next loaded with the ON/OFF control level data in step 216. In this step, the controller 131 loads the DAC systems 132, 134 with the voltage level data that is used to drive the elements of the spatial light modulator 130. Sometimes, the control level data for the elements are stored during a factory calibration step. In another implementation, this control level data is based upon the result of the last calibration sequence that was run on the imagesetter or platesetter.

Next, in step 218, the controller 131 determines whether the OFF level calibration is required. If it is, the OFF calibration subsequence is run in step 220.

Then, in step 222, the controller 131 determines whether ON level calibration is required. If ON level calibration is required, the ON level calibration subsequence is performed in step 224.

Finally, the system determines whether the present job is related to a previous job in step 226. The operator typically supplies this information. It is important, within the same job, that the average exposure levels are substantially the same. In this situation, the factory set exposure level may be too imprecise. As a result, in step 228, if this present job is related to a previous job, an exposure level calibration subsequence is run in step 228. Finally, in step 230, the media 12 on the drum 110 is exposed based upon the image data provided to the spatial light modulator 130 by the controller 131.

Figure 3:
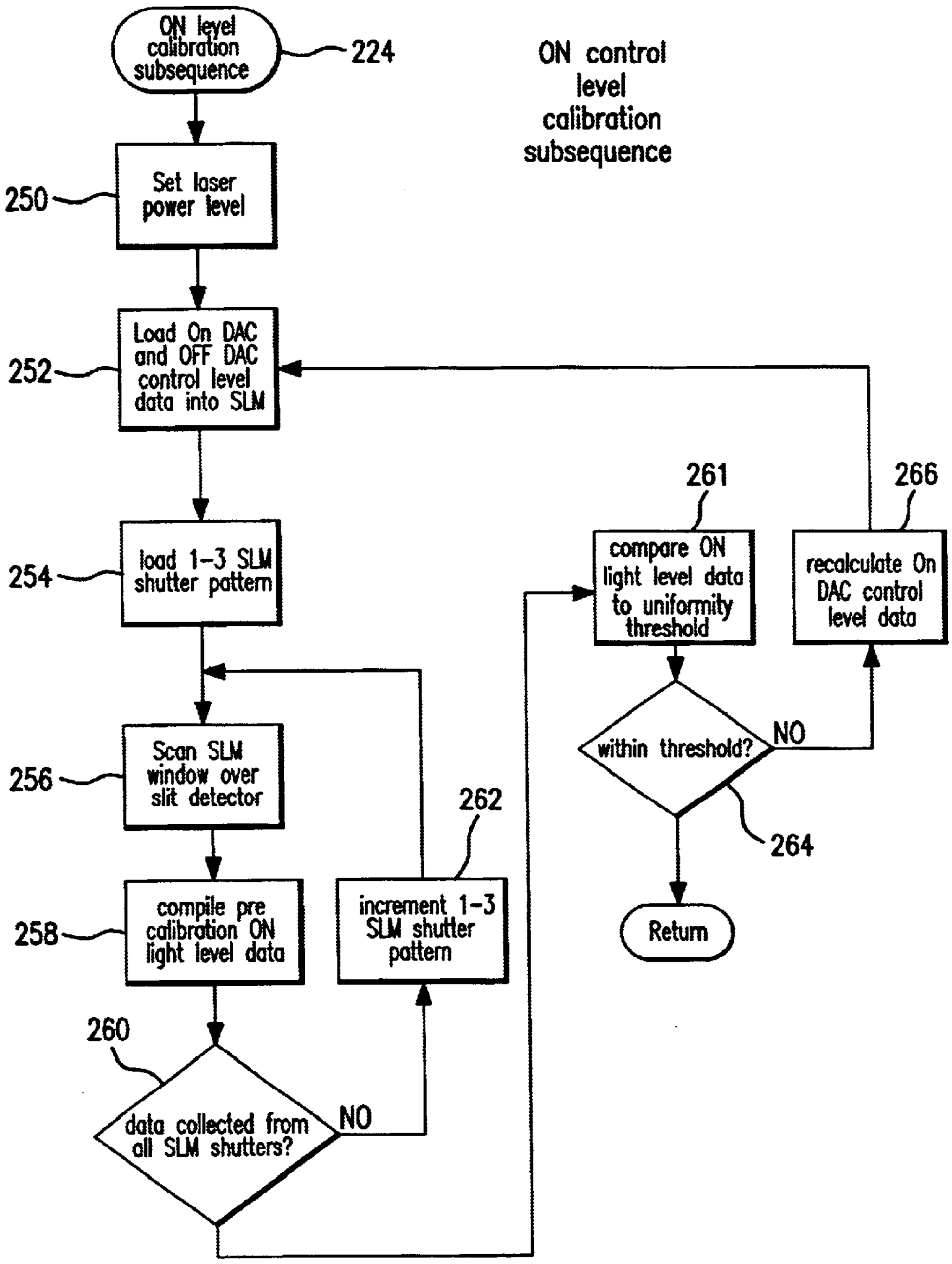
FIG. 3 is a flow diagram of ON level calibration subsequence showing a process for generating a uniform exposure level across the spatial light modulator according to the present invention.

FIG. 3 is a flow diagram showing an ON control level calibration subsequence 224 according to the present invention. Specifically, the laser power level is reset in step 250. Then, the ON DAC system 132 and the OFF DAC system 134 are loaded with ON and OFF control level data for the elements of the spatial light modulator 130 in step 252.

The controller 131 then further loads the spatial light modulator with a 1-ON, 3-OFF image data modulation sequence in step 254. This corresponds to an exposure pattern in which only every fourth element or shutter of the spatial light modulator 130 is in a transmissive state. Specifically, every fourth shutter is driven in response to the corresponding ON control level data held in its DAC of the ON DAC system 132. The remaining shutters are driven in response to their corresponding OFF control level data held in the OFF DAC system 134.

The carriage 120 is then moved on the track 140 to the calibration position 156 in which the spatial light modulator 130 is scanned opposite the aperture 154 of the calibration sensor 150 in step 256. The controller 130 monitors the output of the photodiode 152 and compiles an array of precalibration exposure level data in step 258. This exposure level data corresponds to the light that is transmitted through the spatial light modulator 130 and received at the image plane of the projection optics 128 for the media 12.

On the first pass through this process flow, however, the array of exposure level data is incomplete since data are gathered from 1 in 4 of the elements of the spatial light modulator 130. As a result, in step 260, it is determined whether data has been collected for all of the elements of the spatial light modulator 130. If not, then the ON-1, 3-OFF spatial light modulator shutter pattern is incremented in step 262 and the process steps 256 and 260 repeated. This way, the system generates a complete array of precalibration exposure level data for all of the elements of the spatial light modulator 130.

The 1-ON, 3-OFF shutter pattern, combined with successive scans is used to ensure that the controller 131 can discriminate the responses of the individual elements of the spatial light modulator 130. For high-resolution systems, the corresponding size of the pixels at the image plane is small. Using the 1-ON, 3-OFF shutter pattern allows the calibration sensor to have a reasonably sized aperture, yet discriminate the responses of individual elements.

In step 261, the controller 131 compares the exposure level data across the spatial light modulator to a uniformity threshold. Generally, the controller 131 is determining whether there are large deviations in the level of exposure across the spatial light modulator 130.

If there is poor uniformity, as determined in step 264, the controller 131 calculates new ON control level data in step 266, which is then loaded in step 252. The process repeats to ensure that this new control level data provides uniformity within the threshold.

Figure 4:
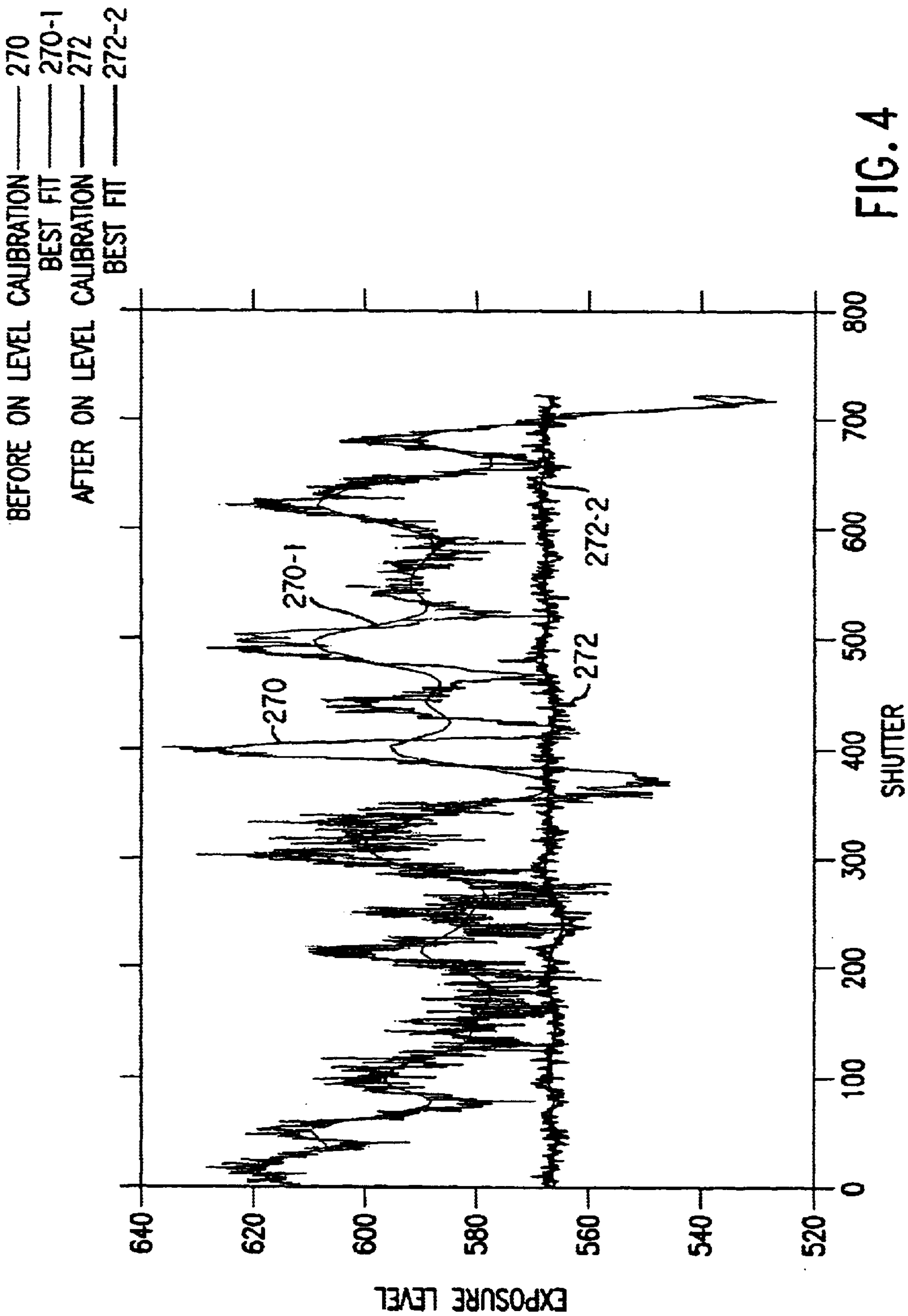
FIG. 4 is a plot showing precalibration and post calibration exposure level data as a function of shutter position in the spatial light modulator used in the present invention.

FIG. 4 is a plot of the exposure level data before and after calibration. Specifically, the level of exposure for exposure level data array 270 shows wide variations in exposure. Specifically, the data varies from approximately a count of 640 to approximately 540 for an analog-to-digital converter that monitors the output of the photodiode 152.

The exposure level data compiled after the recalculation of the ON DAC control level data (step 266) has been loaded in the ON DAC system 132 corresponds to data array 272. Here, the exposure level generally is consistent, varying between 565 to 570 counts, showing good uniformity across the 700 shutters of the spatial light modulator 130, in one implementation.

Figure 5:
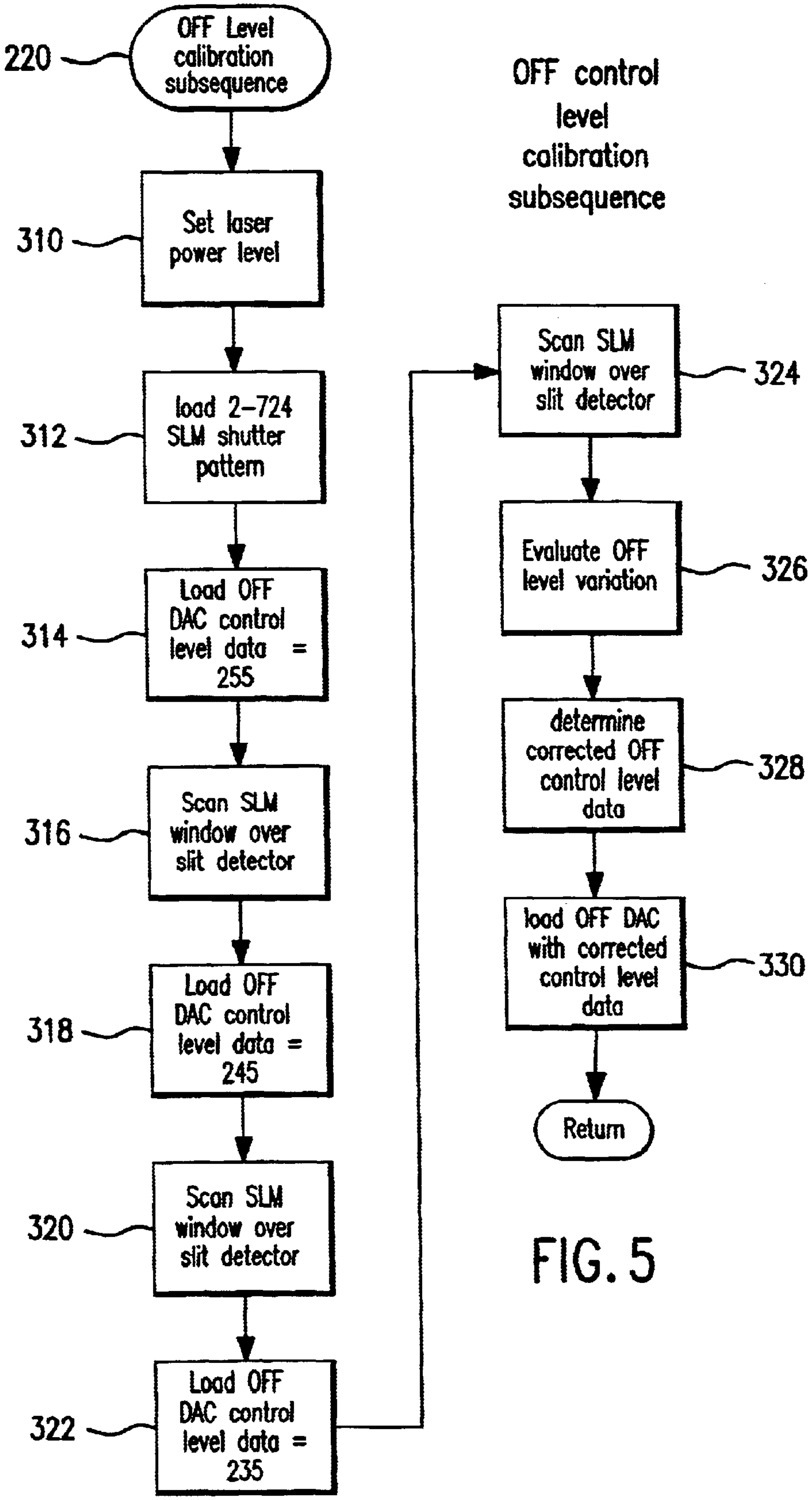
FIG. 5 is a flow diagram of the OFF level calibration subsequence showing the process for providing uniformity in the dark level across the spatial light modulator according to the present invention.

FIG. 5 shows the OFF level calibration sequence 220. Specifically, in step 310, the laser power level is set. Then, in step 312, the spatial light modulator 130 is loaded with a 2-ON, 724-OFF shutter pattern. This shutter pattern corresponds to a pattern in which most of the elements of the spatial light modulator 130 are in a non-transmissive state. Then, the OFF DAC system 134 is loaded so that each element is driven with the same OFF control level data in step 314. Specifically, the digital-to-analog converters of the OFF DAC system 134 are loaded so that they all drive the elements of the spatial light modulator 130 to a level determined by a DAC count of 255. Then, in step 316, the carriage 120 is moved to the calibration position 156 and scanned so that the spatial light modulator 130 passes in front of the aperture 154 of the calibration sensor 150. The controller 131 monitors the response of the photodiode 152 during this scanning operation to generate an array of OFF or dark level data corresponding to this first DAC setting.

In step 318, the OFF DAC system 134 is loaded with a new OFF control level data.

Specifically, in the specific implementation, it is loaded with a DAC count of 245, so that the elements of the spatial light modulator 130 are generally uniformly driven to this new off level. Then, in step 320, the carriage is again moved to the calibration position 156 and scanned over the spatial light modulator 130. This enables the controller 131 to generate a second array of OFF or dark level data corresponding to this second DAC setting.

Finally, in step 322, the OFF DAC system 134 is loaded with OFF control level data corresponding to a 235 DAC count. Then again, in step 324, the carriage 120 is again scanned. This scanning allows the controller 131, monitoring the output of the photodiode 152, to generate a third array of OFF level data corresponding to this third DAC setting for the elements of the spatial light modulator 130.

In step 326, the controller 131 evaluates the variation in the acquired OFF level data in the three data arrays. It then interpolates using the data of the three arrays to find an optimally uniform and optimally dark OFF control level setting for each of the elements of spatial light modulator in step 328. The resulting, new corrected OFF control level data is then loaded into the OFF DAC 134 in step 330.

Figure 6:
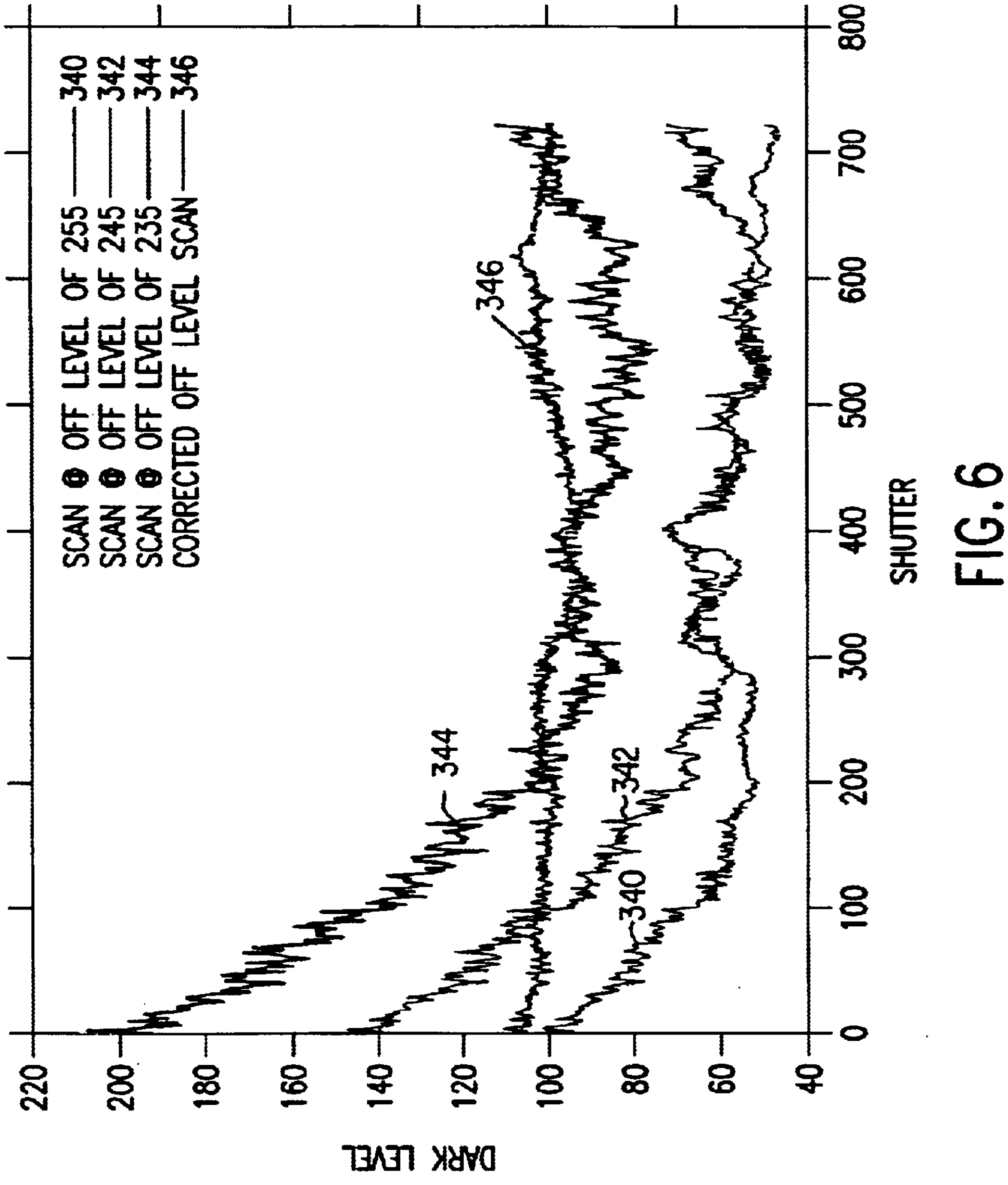
FIG. 6 is a plot of precalibration and post calibration dark level data as a function of shutter position in the spatial light modulator used in the present invention.

FIG. 6 is a plot of dark level data as a function of the shutter in the spatial light modulator 130. It shows that for the data arrays corresponding to the DAC setting of 255, see data 340, the DAC setting 245, see data array 342, and the DAC setting 235, see data array 344.

There is generally poor uniformity across the shutters of the spatial light modulator 130, illustrating that simply selecting a uniform DAC level for every element of the spatial light modulator 130 will generally yield poor performance. However, in step 328 of FIG. 5, the controller 131 uses the information from the three data arrays 340, 342, 344 to generate corrected OFF control level data by selecting counts between 235 and 255 for the various DACs of the OFF DAC system 134 by an interpolation process. The selection yields the corrected OFF light level data 346. This shows that a generally uniform level is achieved across the shutters of the spatial light modulator 130 using the data from the three arrays of dark level data collected in steps 314–322 of FIG. 5.

Figure 7:
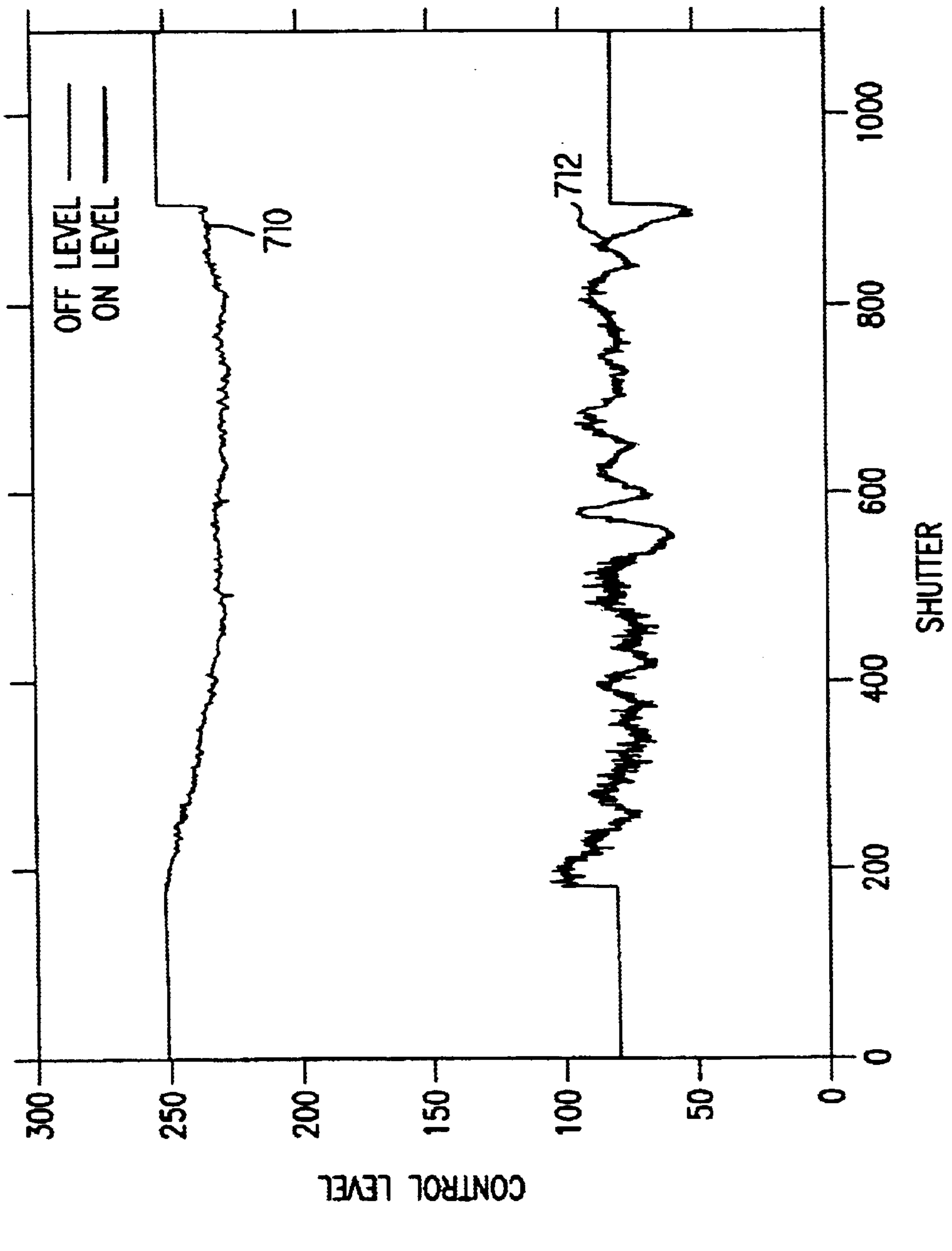
FIG. 7 is a plot of OFF level control data and ON level control data as a function of shutter position, these data being used to control the exposure level and dark level for a calibrated spatial light modulator according to the present invention.

FIG. 7 is a plot of OFF control level data and ON control level data for the shutters of the spatial light modulator, across shutters 200–900. These control level data are generated during the calibration subsequences of FIGS. 3 and 5. Generally, the OFF level data 710 exhibits a trend across the spatial light modulator. This is typically due to wafer-level process variation during fabrication. The ON level data 712 tend to be less spatially correlated.

Figure 8:
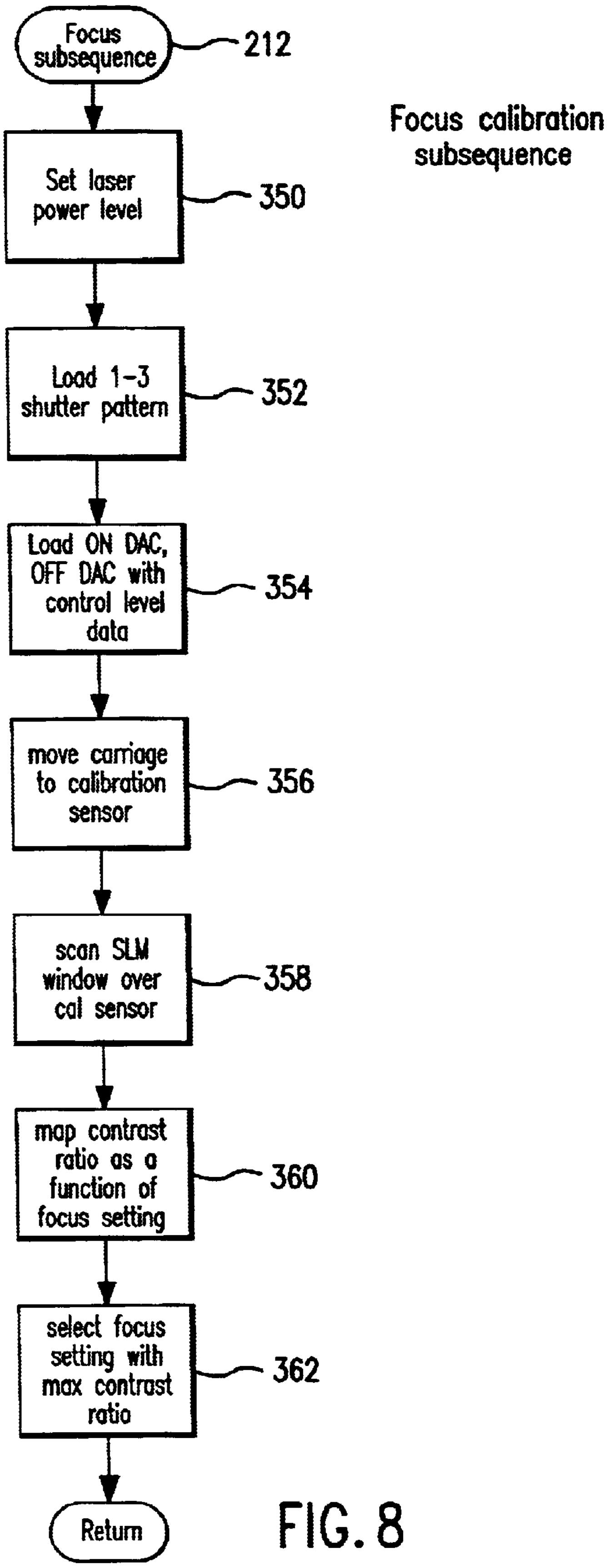
FIG. 8 is a flow diagram showing a best focus calibration subsequence according to the present invention.

FIG. 8 is a flow diagram illustrating the focus subsequence 212. Specifically, the laser power level is set in step 350. Then, the elements of the spatial light modulator 130 are loaded with a 1-ON, 3-OFF shutter pattern in 352. To review, in this shutter pattern, only every fourth shutter is in a transmissive state.

In step 354, the ON DAC system 132 and the OFF DAC system 134 are loaded with the control level data. Further, in step 356, the carriage 120 is moved to the calibration position 156 in front of the calibration sensor 150 such that the spatial light modulator 130 is scanned opposite the aperture 154. This scanning occurs in step 358 while the focus setting for the projection optics 128 is changed.

The controller 131 then monitors the response of the photodiode 152 to generate a contrast ratio map in step 360. A contrast ratio map plots the on-light levels and the off-light levels for various shutters of the spatial light modulator and for various focus settings. Specifically, the focus setting of the projection optics 128 is changed in a continuous fashion across the scan of the spatial light modulator 130. As a result, the exposure level data and the dark level data exhibit variation across the spatial light modulator that corresponds to the changes in the focus setting during the scan.

In step 362, the controller 131 selects the focus setting from the contrast map generated in step 360 to maximize the contrast ratio between the OFF light level data and the exposure light level data.

Figure 9:
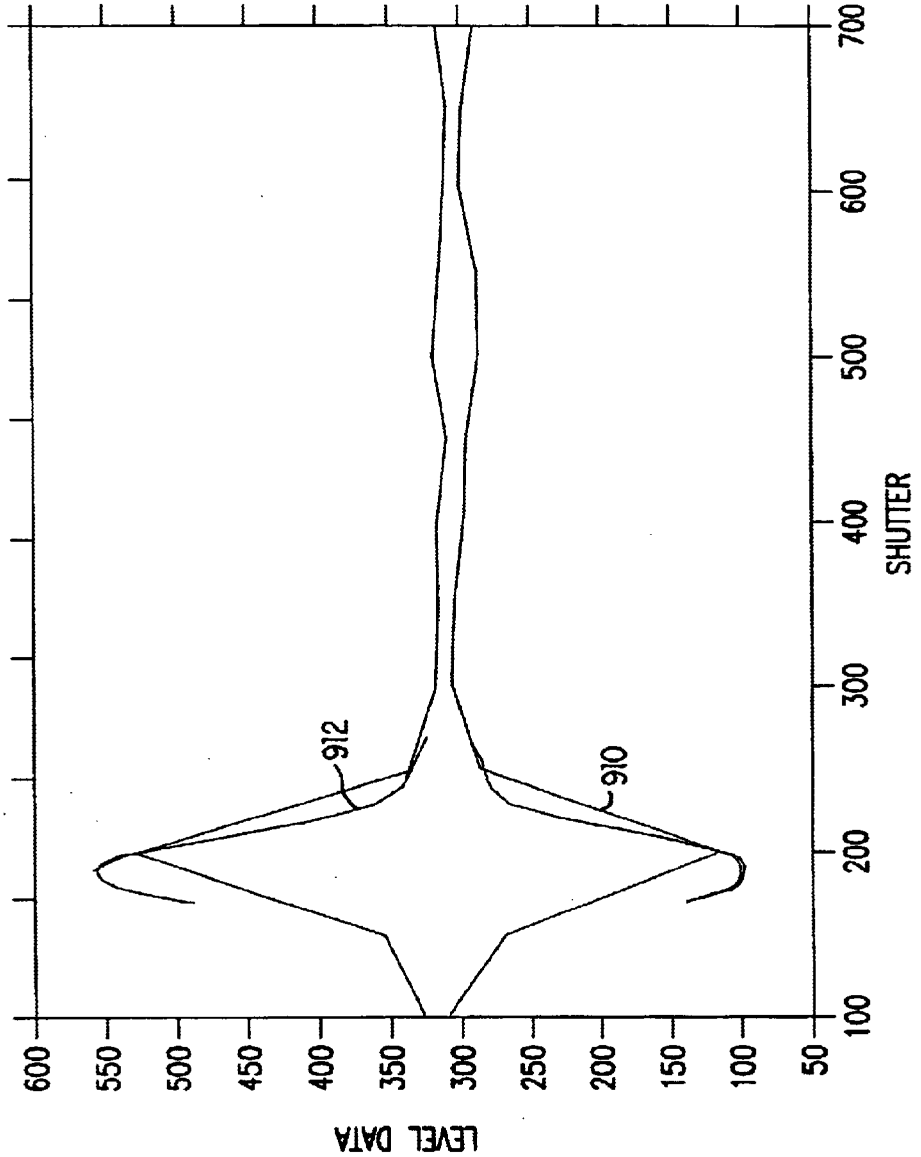
FIG. 9 is a plot of exposure level and dark level data for different focus settings illustrating the change in the contrast ratio with changes in the focus setting.

FIG. 9 is a plot of the contrast ratio map that is generated during the scan of step 358. Specifically, the exposure level data 912 and the dark level data at different shutter positions corresponds to different focus settings for the projection optics 129 under control of the Hall motor 129. The maximum contrast ratio focus setting corresponds to the focus setting applied when elements approximately 190 to 200 were scanned over the calibration sensor 150. The corresponding Hall motor position is stored as the best focus position by controller 131. In this way, the present invention sets the best focus setting to maximize the contrast ratio. In the spatial light modulator systems, this contrast ratio is a figure of merit determining their performance.

Figure 10:
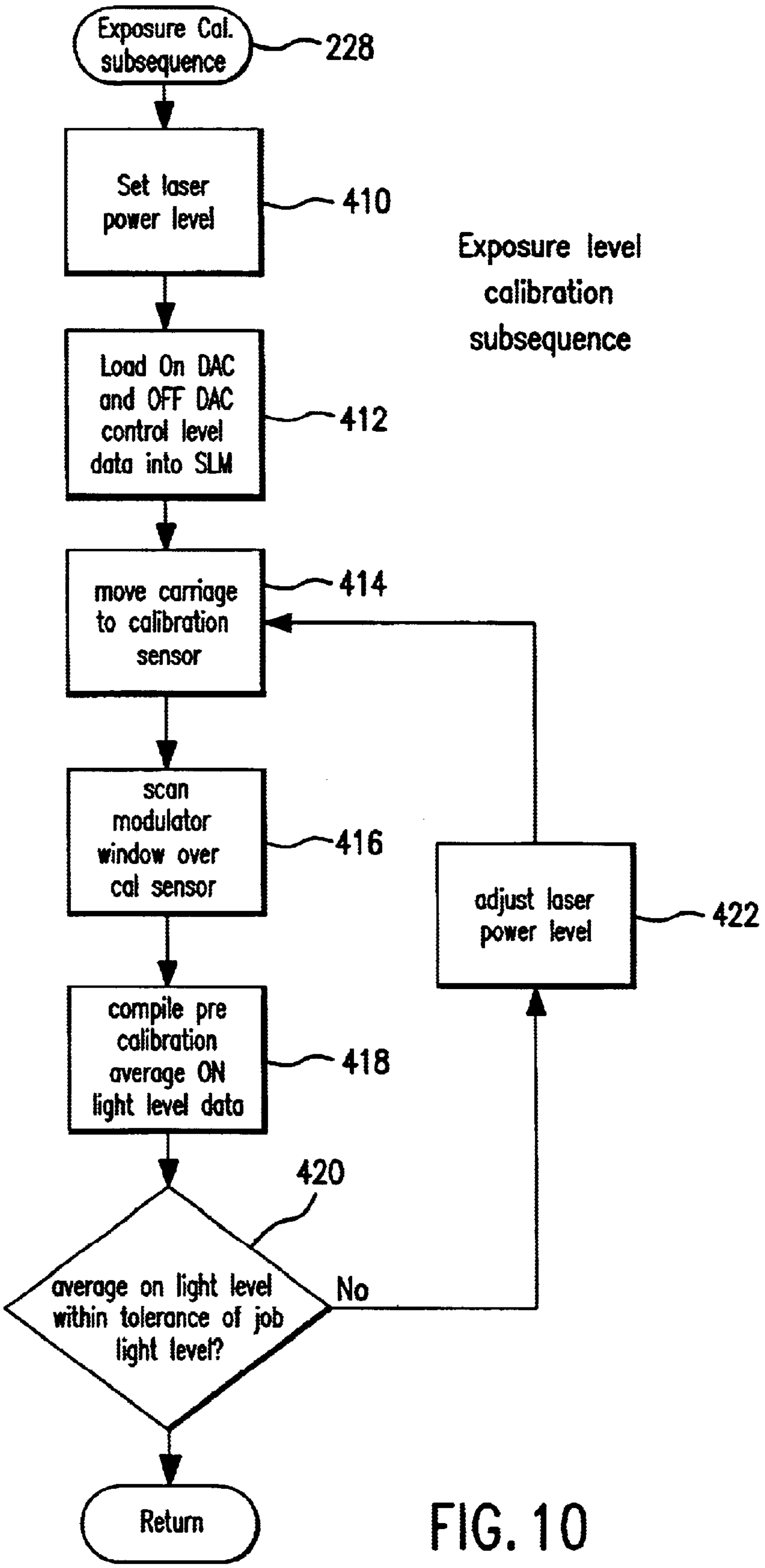
FIG. 10 is a flow diagram showing an exposure level calibration subsequence according to the present invention.

FIG. 10 is a flow diagram illustrating an exposure level calibration sub sequence 228. Many times, especially within the same job, it is important for the platesetter or imagesetter to expose successive plates within the same job at the same exposure setting. The process of FIG. 10 accomplishes this.

Specifically, in the first step 410, the laser power level of the light source 122 is set. Then, the ON DAC system 132 and the OFF DAC system 134 are loaded with the control level data in step 412. Then, in step 414, the carriage 120 in moved to the calibration position 156 and the spatial light modulator 130 scanned in front of the aperture 154 of the calibration sensor 150 in step 416.

The controller 132 then monitors the output of the photodiode 152 and determines an average exposure level across the entire scan of the spatial light modulator 130 in front of the calibration sensor 150 in step 418. This detected average light level is then compared to the light level for a previous exposure of a plate for the same job or a similar pre-exposure calibration step. If it is determined to be outside an acceptable tolerance level, in step 420, the laser power level is adjusted by the controller 131 in step 422 and then, the sequence repeated to ensure that the average exposure level is the same for the two media exposures in the same job.

While this invention has been particularly shown and described with references to preferred embodiments thereof, it will be understood by those skilled in the art that various changes in form and details may be made therein without departing from the scope of the invention encompassed by the appended claims.

What is claimed is:

1. A calibration system for an imaging engine of a platesetter/imagesetter comprising an media drum and a carriage including a light source, projection optics, and a spatial light modulator for selectively exposing media held against the drum, the calibration system comprising:

a calibration sensor relative to which the spatial light modulator is scanned; and a controller that analyzes responses of the calibration sensor to generate focus information used to control the projection optics.

2. A calibration system as claimed in claim 1, wherein the calibration sensor comprises a photodiode and a slit aperture to detect responses of individual elements of the spatial light modulator.

3. A calibration system as claimed in claim 1, wherein the controller compares exposure levels provided by the spatial light modulator for different focus settings.

4. A calibration system as claimed in claim 1, wherein the controller compares dark levels provided by the spatial light modulator for different focus settings.

5. A calibration system as claimed in claim 1, wherein the controller compares contrast levels provided by the spatial light modulator for different focus settings.

6. A calibration system as claimed in claim 1, wherein the controller selects a focus setting yielding a maximum contrast ratio.

7. A calibration system as claimed in claim 1, further comprising photosensitive media an outside of the drum.

8. A calibration system as claimed in claim 1, wherein the media comprise a plate.

9. A calibration system as claimed in claim 1, wherein the carriage moves on a track along side the drum.

10. A calibration system as claimed in claim 1, wherein the controller loads a modulation pattern into the spatial light modulator enabling discrimination of exposure levels provided by individual elements of the spatial light modulator.

11. A calibration system as claimed in claim 10, wherein the modulation pattern comprises on-state elements surrounded by off-state elements of the spatial light modulator.

12. A method for calibrating a platesetter/imagesetter comprising an media drum and a carriage including a light source, projection optics, and a spatial light modulator for selectively exposing media held against the drum, the method comprising:

detecting exposure levels provided by elements of the spatial light modulator for different focus settings;

determining a best focus setting for the projection optics in response to the exposure levels; and exposing media using the best focus setting.

13. A method as claimed in claim 12, wherein the step of detecting the exposure levels comprises scanning the spatial light modulator over a calibration sensor while changing the focus setting.

14. A method as claimed in claim 12, further comprising detecting dark levels provided by the elements of the spatial light modulator for different focus settings.

15. A method as claimed in claim 12, further comprising selecting the best focus setting in response to a contrast ratio between the detected dark levels and the exposure levels.

16. A method as claimed in claim 15, wherein the step of detecting the exposure levels further comprises loading a modulator pattern into the spatial light modulator enabling discrimination of exposure levels provided by individual elements of the spatial light modulator.

* * * * *